US012604332B2

(12) United States Patent
Huang et al.

(10) Patent No.: US 12,604,332 B2
(45) Date of Patent: Apr. 14, 2026

(54) TECHNIQUES FOR SENDING ASSISTANCE INFORMATION FOR CANCELLING INTERFERENCE IN WIRELESS COMMUNICATIONS

(71) Applicant: QUALCOMM Incorporated, San Diego, CA (US)

(72) Inventors: Chu-Hsiang Huang, San Diego, CA (US); Jae Won Yoo, San Diego, CA (US); Andreas Maximilian Schenk, Bavaria (DE); Jae Ho Ryu, San Diego, CA (US); Hari Sankar, San Diego, CA (US); Gaurav Nigam, Millburn, NJ (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 18/366,421

(22) Filed: Aug. 7, 2023

(65) Prior Publication Data

US 2024/0114540 A1 Apr. 4, 2024

Related U.S. Application Data

(60) Provisional application No. 63/376,745, filed on Sep. 22, 2022.

(51) Int. Cl.
| | |
|---|---|
| *H04W 72/541* | (2023.01) |
| *H04L 1/00* | (2006.01) |
| *H04W 72/121* | (2023.01) |

(52) U.S. Cl.
CPC ......... *H04W 72/541* (2023.01); *H04L 1/0003* (2013.01); *H04W 72/121* (2013.01)

(58) Field of Classification Search
CPC ... H04L 5/0051; H04L 5/0053; H04L 5/0023; H04L 5/0048; H04L 5/0016; H04L 5/0094; H04L 5/0091; H04W 72/23; H04W 72/1273; H04W 72/1268; H04W 74/006; H04W 74/0833; H04W 74/0838; H04B 7/0626; H04B 17/373; Y02D 30/70
See application file for complete search history.

(56) References Cited

U.S. PATENT DOCUMENTS

| | | | | |
|---|---|---|---|---|
| 2022/0095367 | A1* | 3/2022 | Kim | H04W 72/1273 |
| 2022/0239433 | A1* | 7/2022 | Kim | H04L 5/0051 |
| 2022/0322399 | A1* | 10/2022 | Kim | H04W 72/1273 |
| 2024/0340864 | A1* | 10/2024 | Yi | H04W 8/22 |
| 2025/0024516 | A1* | 1/2025 | Lee | H04W 74/006 |
| 2025/0097910 | A1* | 3/2025 | Yi | H04L 1/189 |

* cited by examiner

*Primary Examiner* — Jung Liu
(74) *Attorney, Agent, or Firm* — ArentFox Schiff LLP

(57) ABSTRACT

Aspects described herein relate to receiving, from a network node, an indication of information related to a configuration, including at least one of a modulation and coding scheme (MCS), a physical downlink shared channel (PDSCH) duration, a scrambling sequence, or a reference signal location, used for transmitting downlink signals to one or more co-scheduled UEs, receiving, from the network node, a downlink signal intended for the UE, wherein the signal is interfered by one or more interference signals transmitted to the one or more co-scheduled UEs, and removing, based on the indication, the one or more interference signals from the downlink signal. Other aspects relate to transmitting the information and downlink signals.

30 Claims, 8 Drawing Sheets

600

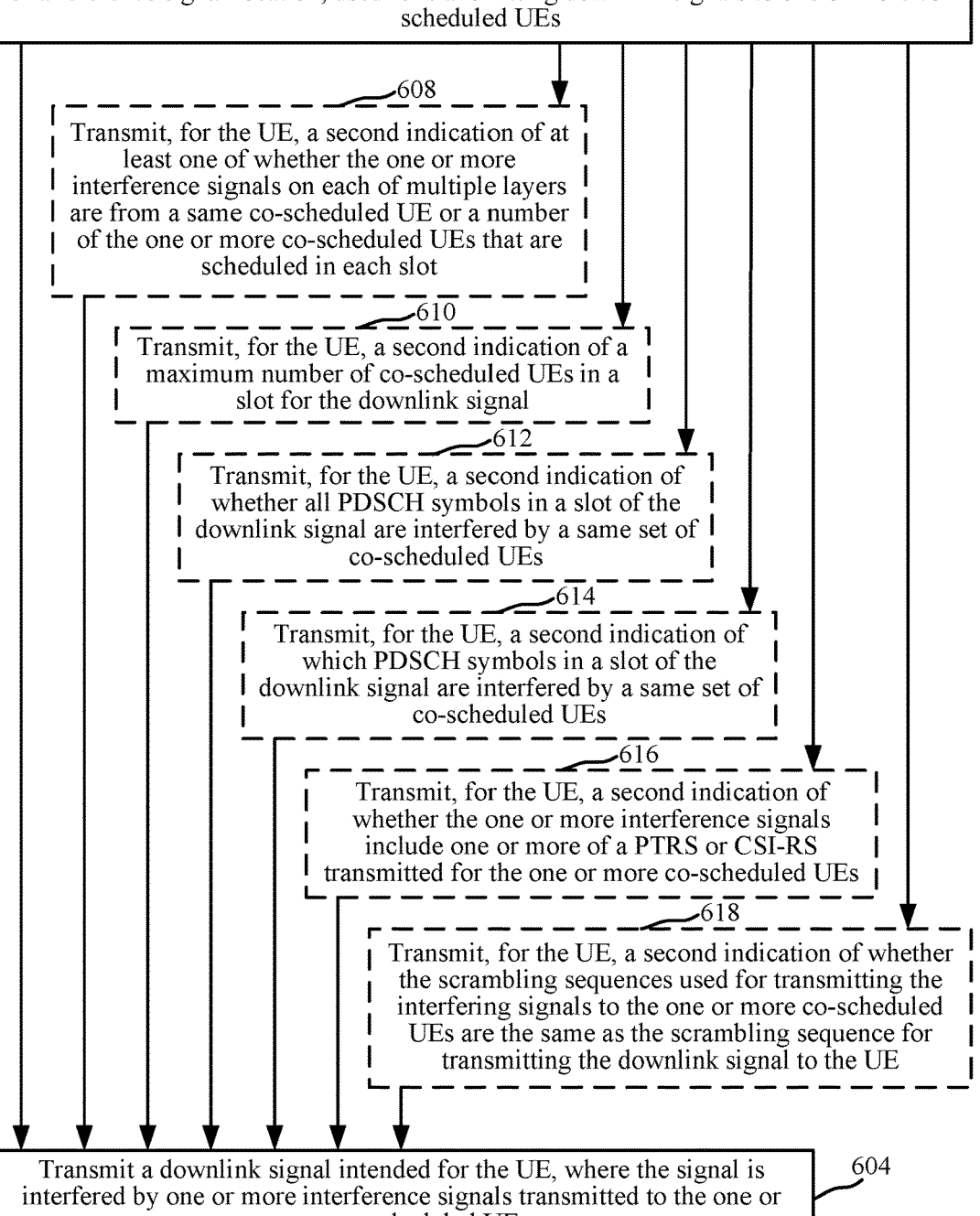

602

Transmit, for a UE, an indication of information related to a configuration, including at least one of a MCS or MCS table, PDSCH symbols or duration, a scrambling sequence, or a reference signal location, used for transmitting downlink signals to one or more co-scheduled UEs

608

Transmit, for the UE, a second indication of at least one of whether the one or more interference signals on each of multiple layers are from a same co-scheduled UE or a number of the one or more co-scheduled UEs that are scheduled in each slot

610

Transmit, for the UE, a second indication of a maximum number of co-scheduled UEs in a slot for the downlink signal

612

Transmit, for the UE, a second indication of whether all PDSCH symbols in a slot of the downlink signal are interfered by a same set of co-scheduled UEs

614

Transmit, for the UE, a second indication of which PDSCH symbols in a slot of the downlink signal are interfered by a same set of co-scheduled UEs

616

Transmit, for the UE, a second indication of whether the one or more interference signals include one or more of a PTRS or CSI-RS transmitted for the one or more co-scheduled UEs

618

Transmit, for the UE, a second indication of whether the scrambling sequences used for transmitting the interfering signals to the one or more co-scheduled UEs are the same as the scrambling sequence for transmitting the downlink signal to the UE

604

Transmit a downlink signal intended for the UE, where the signal is interfered by one or more interference signals transmitted to the one or more co-scheduled UEs

FIG. 6

TECHNIQUES FOR SENDING ASSISTANCE INFORMATION FOR CANCELLING INTERFERENCE IN WIRELESS COMMUNICATIONS

CLAIM OF PRIORITY UNDER 35 U.S.C. § 119

The present Application for Patent claims priority to Provisional Patent Application No. 63/376,745, entitled "TECHNIQUES FOR SENDING ASSISTANCE INFORMATION FOR CANCELLING INTERFERENCE IN WIRELESS COMMUNICATIONS" filed Sep. 22, 2022, which is assigned to the assignee hereof and hereby expressly incorporated by reference herein for all purposes.

FIELD OF THE DISCLOSURE

Aspects of the present disclosure relate generally to wireless communication systems, and more particularly, to techniques for cancelling interfering signals.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to receive, from a network node, an indication of information related to a configuration, including at least one of a modulation and coding scheme (MCS), a physical downlink shared channel (PDSCH) duration, a scrambling sequence, or a reference signal location, used for transmitting downlink signals to one or more co-scheduled UEs, receive, from the network node, a downlink signal intended for the apparatus, wherein the signal is interfered by one or more interference signals transmitted to the one or more co-scheduled UEs, and remove, based on the indication, the one or more interference signals from the downlink signal.

In another aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to transmit, for a UE, an indication of information related to a configuration, including at least one of a MCS, a PDSCH duration, a scrambling sequence, or a reference signal location, used for transmitting downlink signals to one or more co-scheduled UEs, and transmit a downlink signal intended for the UE, wherein the signal is interfered by one or more interference signals transmitted to the one or more co-scheduled UE.

In another aspect, a method for wireless communication at a UE is provided that includes receiving, from a network node, an indication of information related to a configuration, including at least one of a MCS, a PDSCH duration, a scrambling sequence, or a reference signal location, used for transmitting downlink signals to one or more co-scheduled UEs, receiving, from the network node, a downlink signal intended for the UE, wherein the signal is interfered by one or more interference signals transmitted to the one or more co-scheduled UEs, and removing, based on the indication, the one or more interference signals from the downlink signal.

In another aspect, a method for wireless communication at a network node is provided that includes transmitting, for a UE, an indication of information related to a configuration, including at least one of a MCS, a PDSCH duration, a scrambling sequence, or a reference signal location, used for transmitting downlink signals to one or more co-scheduled UEs, and transmitting a downlink signal intended for the UE, wherein the signal is interfered by one or more interference signals transmitted to the one or more co-scheduled UE.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 6 is a flow chart illustrating an example of a method for configuring a UE to cancel interfering signals, in accordance with aspects described herein;

DETAILED DESCRIPTION

Figure 1:
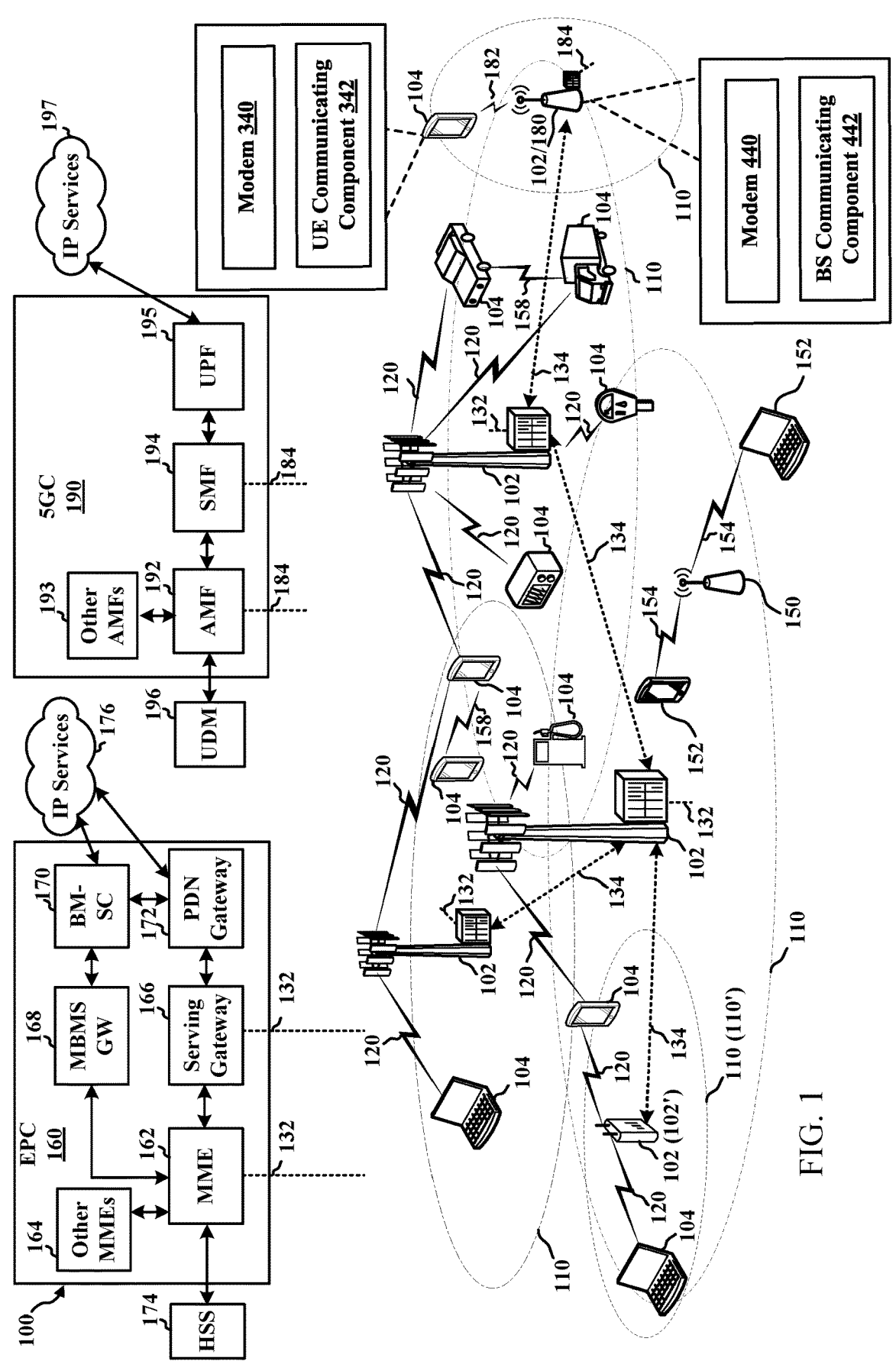
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to communicating assistance information to assist a device in cancelling interfering signals in wireless communications. In some wireless communication technologies, such as fifth generation (5G) new radio (NR), multiple-user multiple-input multiple-output (MU-MIMO) is supported where a network node, such as a gNB or other base station, can concurrently transmit downlink signals to multiple devices (e.g., multiple user equipment (UEs)) and/or can concurrently receive uplink signals from the multiple devices. For example, the network node can employ spatial multiplexing in scheduling or communicating with the UEs. In MU-MIMO scenarios, a given UE (referred to herein as a served UE) may not be informed of a modulation order or other configurations of signals for other spatially multiplexed UEs (referred to herein as co-scheduled UEs for a given served UE). Demodulation performance can benefit from interference cancellation by detecting the signals from co-scheduled UEs and knowing the signal configurations. For example, for a system model:

$$y = [\, h_s \quad h_i \,] \begin{bmatrix} x_s \\ x_i \end{bmatrix} + n,$$

where $x_s$ represents desired signal transmitted from the gNB to the served UE, $x_i$ represents the interfering signal transmitted from the gNB to the co-scheduled UE, $h_s$ and $h_i$ represent the channel coefficients associated with the propagation channel from gNB to the served UE associated with the signal $x_s$ and $x_i$, respectively (without loss of generality, the channel coefficients may be known or estimated with sufficient quality in this example), and n represents any residual noise terms (e.g., thermal noise at the served UE), an interference signal can be removed when $x_i$ is detected. For simplicity, this example relates to a signal interfering co-scheduled UE. For example, in OFDM-like communication systems, such as 5G NR, this system model can define the receive signal per receive antenna, resource element and OFDM symbol index, though to simplify notation and to keep the system model generic, explicit indices related to, e.g., a specific resource element, symbol index, and/or receive antenna, may be omitted. In some examples, the UE can be aware of the modulation order of $x_s$ but not $x_i$, without assistance information. Detection of $x_i$, however, can have infeasible complexity if the network node cannot provide additional assistance information, especially when co-scheduled UEs are on multiple layers with arbitrary modulation orders.

In accordance with aspects described herein, dynamic or semi-static information update can be provided with minimal or low overhead for providing an interference cancellation demodulation algorithm for MU-MIMO with a reasonable complexity. For example, the network node that transmits downlink signals to multiple UEs can inform a given served UE of configuration information used in transmitting downlink signals to one or more co-scheduled UEs to assist the served UE in cancelling, from a downlink signal received from the network node, interfering downlink signals transmitted by the network node to the one or more co-scheduled UEs. For example, the configuration information can include one or more of a modulation and coding scheme (MCS) or MCS table, a physical downlink shared channel (PDSCH) symbols or duration, a scrambling sequence, a reference signal resource location, one or more associated indicators, etc., related to downlink signals transmitted to the one or more co-scheduled UEs. For example, an MCS table can be a list of possible MCSs that can be used by the UE, and in one example, the network node can, once the MCS table is configured, configure an MCS from the list by indicating an index of the MCS in the list. The served UE can use this information to detect and/or cancel the interfering downlink signals.

Cancelling interfering downlink signals from downlink communications from a network node can improve signal quality and throughput for downlink communications from the network node at the UE. This can improve resource usage, UE performance, and thus user experience with using the UE, etc.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for cancelling, based on assistance information from a network node, interference from signals transmitted to co-scheduled UEs, in accordance with aspects described herein. In addition, some nodes may have a modem 440 and BS communicating component 442 for configuring a UE to cancel interference of signals transmitted to co-scheduled UEs, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104.

When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, BS communicating component 442 can transmit, and/or UE communicating component 342 can receive, assistance information for cancelling, from a downlink signal received from the base station 102, interference from signals transmitted to co-scheduled UEs. For example, the assistance information can relate to configurations of the co-scheduled UEs or one or more associated indicators, such as an indication of or corresponding to one or more of a MCS or MCS table, PDSCH symbols or duration, a scrambling sequence, a reference signal resource location, etc., used in transmitting downlink signals to the one or more co-scheduled UEs. For example, UE communicating component 342 can cancel interfering downlink signals, transmitted to the one or more co-scheduled UEs, from a downlink signal transmitted to the UE 104 based on the assistance information, in accordance with aspects described herein.

Figure 2:
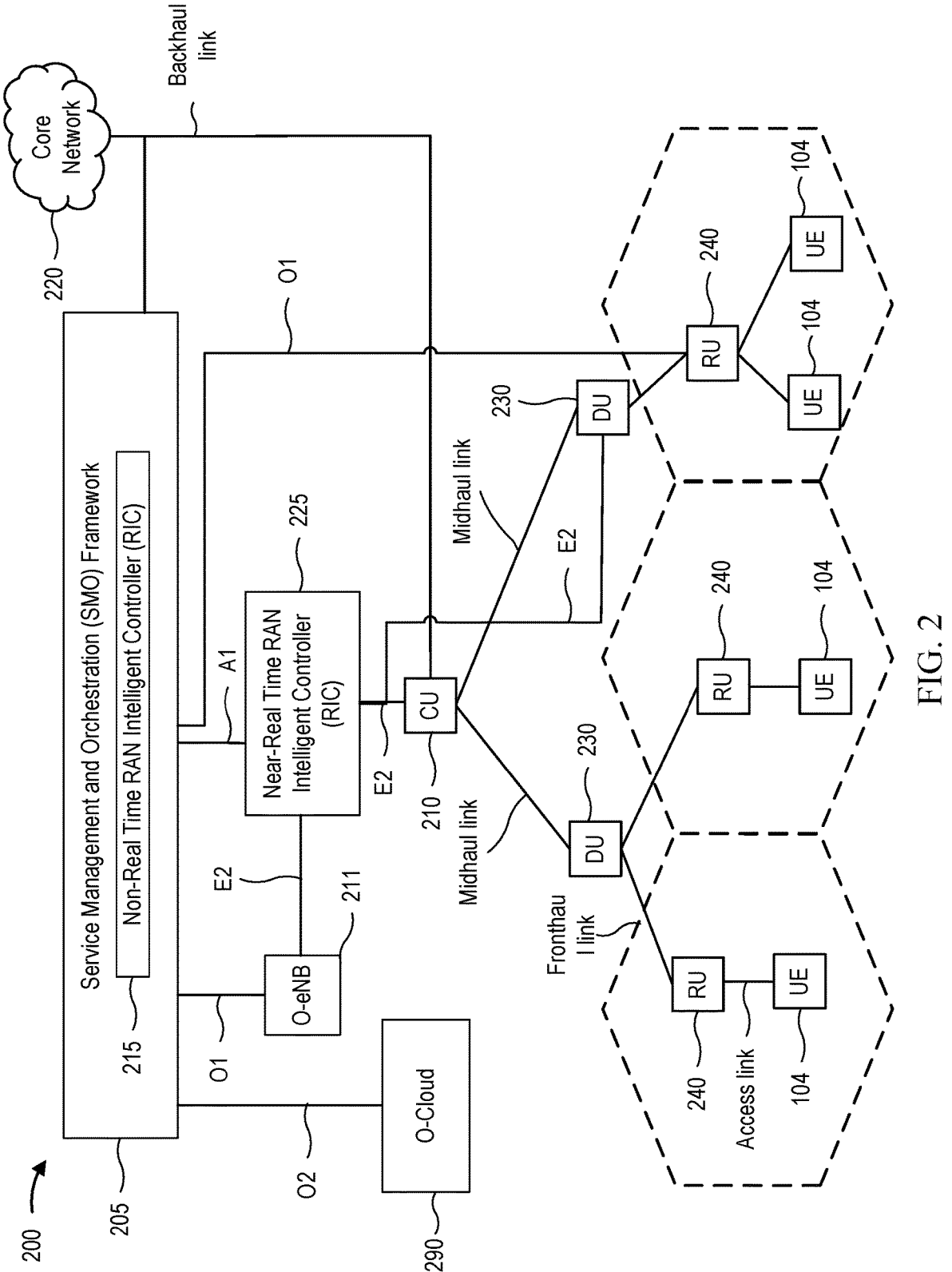
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, BS communicating component 442, as described herein, can be at least partially implemented within a CU 210, and can transmit downlink signals to UEs, configure the UEs to cancel interference of signals transmitted to co-scheduled UEs, etc. via one or more DUs 230, transmit configuration information to the UEs via one or more DUs 230, and/or the like. In another example, BS communicating component 442, as described herein, can be at least partially implemented within a DU 230, and can transmit downlink signals to UEs, configure the UEs to cancel interference of signals transmitted to co-scheduled UEs, etc. via one or more RUs 240, and/or the like.

Figure 3:
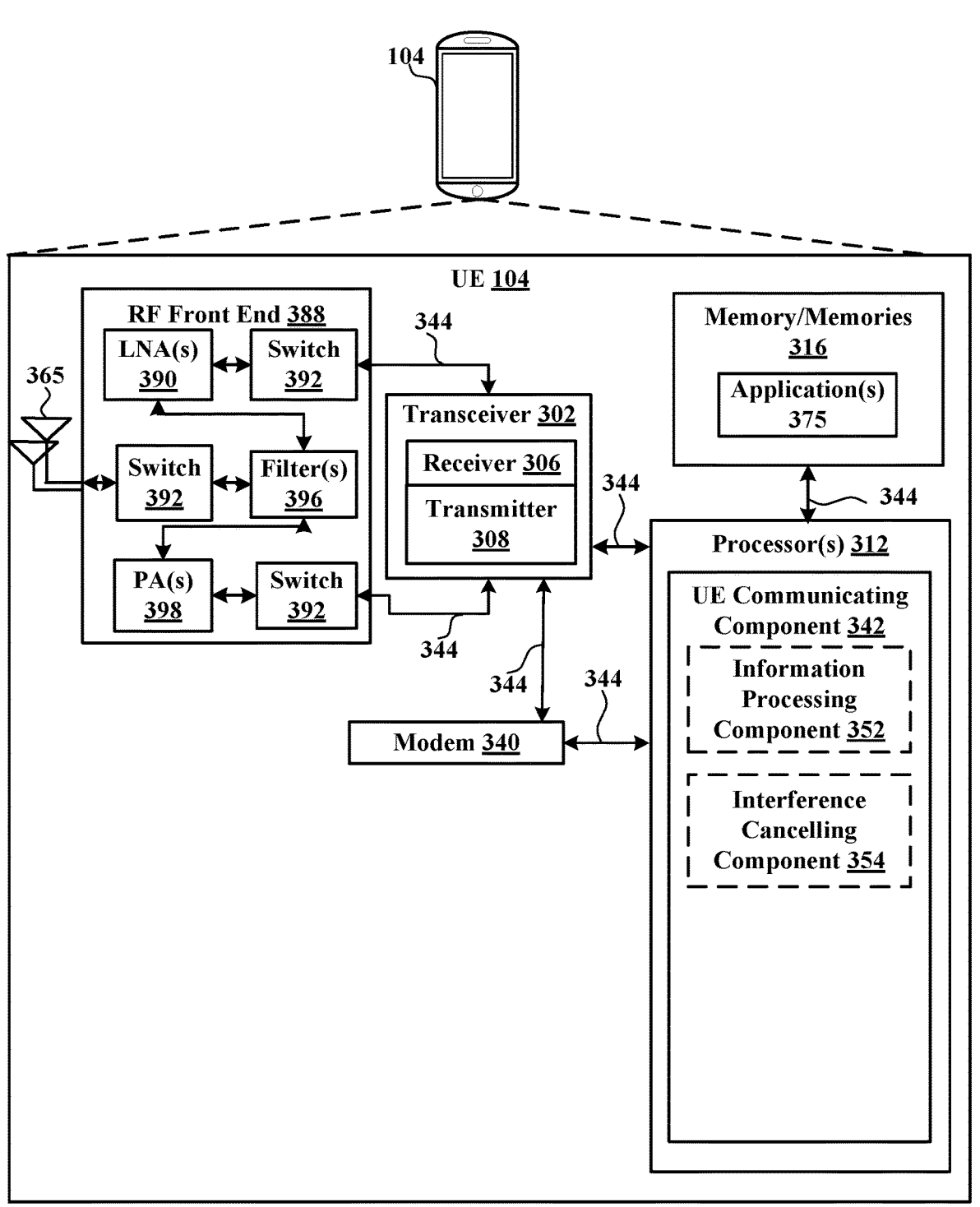
FIG. 3 is a block diagram illustrating an example of a user equipment (UE), in accordance with various aspects of the present disclosure.
Figure 4:
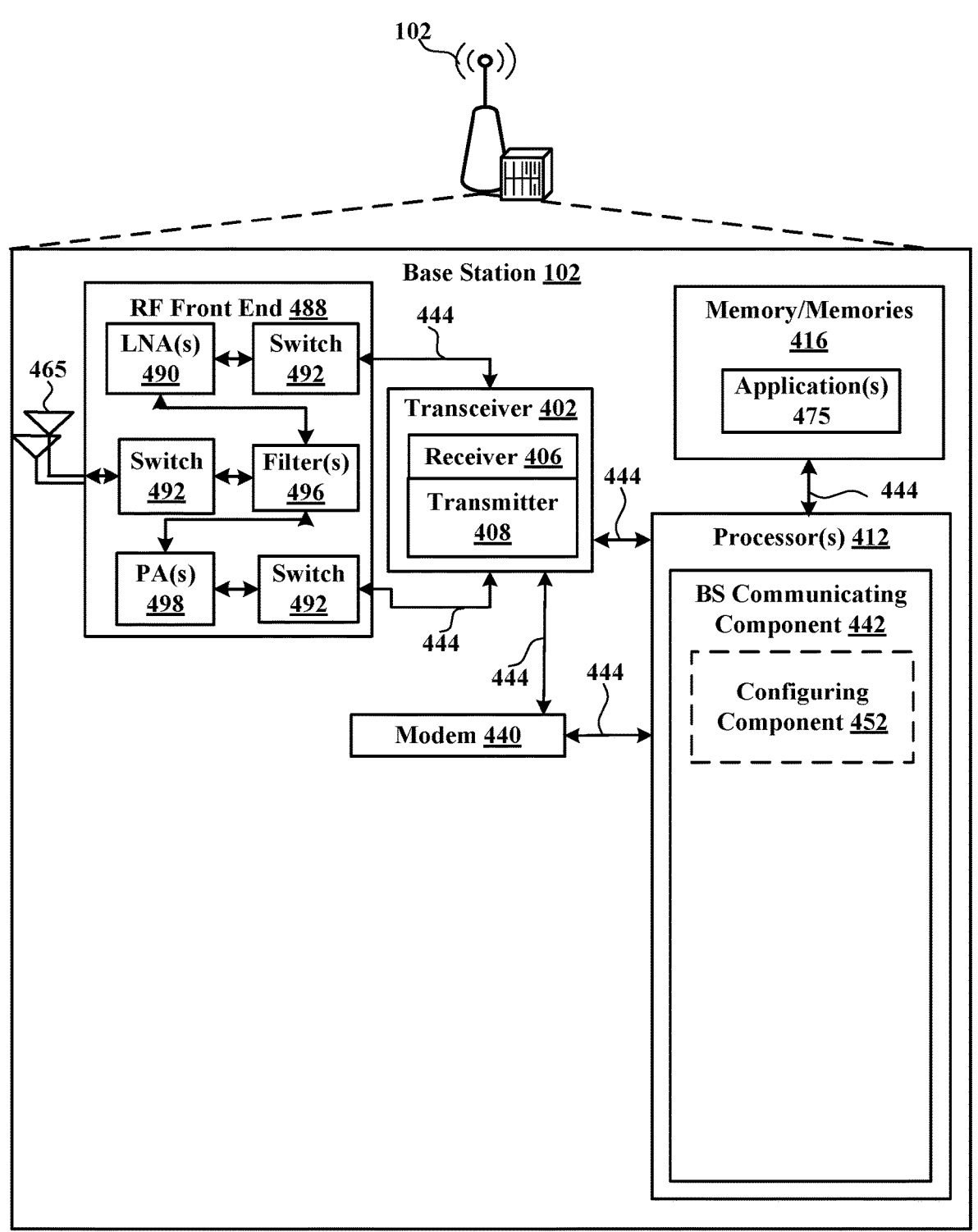
FIG. 4 is a block diagram illustrating an example of a base station, in accordance with various aspects of the present disclosure.
Figure 5:
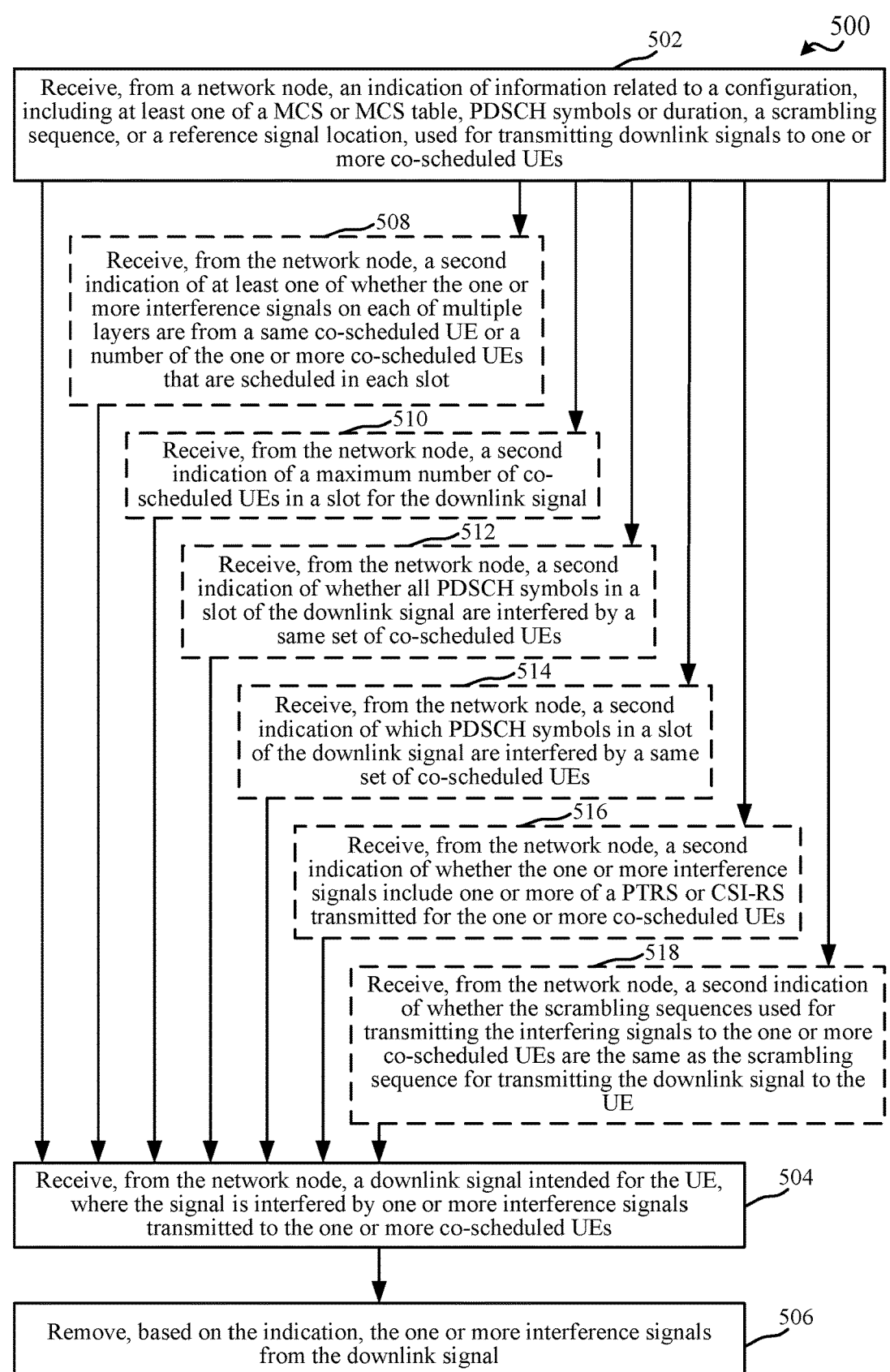
FIG. 5 is a flow chart illustrating an example of a method for cancelling interfering signals based on assistance information or other indications, in accordance with aspects described herein.

Turning now to FIGS. 3-8, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and one or more memories 316 and one or more transceivers 302 in communication via one or more buses 344. For example, the one or more processors 312 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 316 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 312, one or more memories 316, and one or more transceivers 302 may operate in conjunction with modem 340 and/or UE communicating component 342 for cancelling, based on assistance information from a network node, interference from signals transmitted to co-scheduled UEs, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory/memories 316 may be configured to store data used herein and/or local versions of applications 375 or UE communicating component 342 and/or one or more of its subcomponents being executed by at least one processor 312. Memory/memories 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory/memories 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include an information processing component 352 for processing assistance information or other indications for cancelling interference of signals transmitted to co-scheduled UEs from a signal transmitted to the UE 104, and/or an interference cancelling component 354 for performing the interference cancellation based on the assistance information or other indications, in accordance with aspects described herein.

In an aspect, the processor(s) 312 may correspond to one or more of the processors described in connection with the UE in FIG. 8. Similarly, the memory/memories 316 may correspond to the memory described in connection with the UE in FIG. 8.

Referring to FIG. 4, one example of an implementation of base station 102 (e.g., a base station 102 and/or gNB 180, as described above) may include a variety of components, some of which have already been described above, but including components such as one or more processors 412 and one or more memories 416 and one or more transceivers 402 in communication via one or more buses 444. For example, the one or more processors 412 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 416 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 412, one or more memories 416, and one or more transceivers 402 may operate in conjunction with modem 440 and BS communicating component 442 for configuring a UE to cancel interference of signals transmitted to co-scheduled UEs, in accordance with aspects described herein.

The transceiver 402, receiver 406, transmitter 408, one or more processors 412, memory/memories 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a configuring component 452 for generating and/or transmitting assistance information or other indications for cancelling interference of signals transmitted to co-scheduled UEs from a signal transmitted to a given served UE, in accordance with aspects described herein.

In an aspect, the processor(s) 412 may correspond to one or more of the processors described in connection with the base station in FIG. 8. Similarly, the memory/memories 416 may correspond to the memory described in connection with the base station in FIG. 8.

FIG. 5 illustrates a flow chart of an example of a method 500 for cancelling interfering signals based on assistance information or other indications, in accordance with aspects described herein. FIG. 6 illustrates a flow chart of an example of a method 600 for configuring a UE to cancel interfering signals, in accordance with aspects described herein. In an example, a UE 104 can perform the functions described in method 500 using one or more of the components described in FIGS. 1 and 3. In an example, a base station 102 (e.g., a gNB, a monolithic base station, a portion of a disaggregated base station, etc.) can perform the functions described in method 600 using one or more of the components described in FIGS. 1 and 4. Methods 500 and

600 are described in conjunction with one another for ease of explanation; however, the methods 500 and 600 are not required to be performed together and indeed can be performed independently using separate devices.

In method 600, at Block 602, an indication of information related to a configuration, including at least one of a MCS or MCS table, PDSCH symbols or duration, a scrambling sequence, or a reference signal location, used for transmitting downlink signals to one or more co-scheduled UEs can be transmitted for a UE. In an aspect, configuring component 452, e.g., in conjunction with processor(s) 412, memory/memories 416, transceiver 402, BS communicating component 442, etc., can transmit, for a UE (e.g., a served UE 104), an indication of information related to the configuration, including at least one of a MCS or MCS table, PDSCH symbols or duration, a scrambling sequence, or a reference signal location, used for transmitting downlink signals to one or more co-scheduled UEs. For example, the indication of information can include one or more parameters of the associated configuration, which can enable the UE 104 to cancel the interfering signals transmitted for the one or more co-scheduled UEs.

In method 500, at Block 502, an indication of information related to a configuration, including at least one of a MCS or MCS table, PDSCH symbols or duration, a scrambling sequence, or a reference signal location, used for transmitting downlink signals to one or more co-scheduled UEs can be received from a network node. In an aspect, information processing component 352, e.g., in conjunction with processor(s) 312, memory/memories 316, transceiver 302, UE communicating component 342, etc., can receive, from the network node (e.g., base station 102), the indication of information related to the configuration, including at least one of a MCS or MCS table, PDSCH symbols or duration, a scrambling sequence, or a reference signal location, used for transmitting downlink signals to one or more co-scheduled UEs. For example, information processing component 352 can receive the indication of information in one or more signals, which may include an radio resource control (RRC) signal, a media access control (MAC)-control element (CE), downlink control information (DCI), etc. For example, information processing component 352 can receive the indication of the information in a UE-specific PDSCH-config or common configuration, such as PDSCH-Common-Config, in RRC signaling.

In a specific example, the configuration can include a modulation and coding scheme configuration, and the indicated information can include an indication of a MCS index table configured for transmitting the downlink signals (e.g., PDSCH signals) to the one or more co-scheduled UEs. For example, the UE 104 can be configured with a MCS index table for receiving the downlink signal from the base station 102, and in Block 502 can also receive the indication of the information of the MCS index tables used by the base station 102 for communicating with the co-scheduled UEs. This can enable the UE 104 to cancel interfering signals intended for the co-scheduled UEs by using the MCS index tables. For example, the information related to the configuration can include an indication of which MCS index table(s) for PDSCH of co-scheduled UEs are signaled (e.g., the content of one or more RRC parameters configured for the co-scheduled UEs, such as mcs-Table-r17, mcs-TableDCI-1-2-r17, mcs-TableDCI-1-2, mcs-Table in SPS-config or PDSCH-Config, as defined in 5G NR).

For example, the information related to the configuration can include an indication of which or whether MCS tables with a certain quadrature amplitude modulation (QAM), such as 64QAM, 256QAM, or 1024QAM, are enabled or not for co-scheduled UEs. In another example, the information related to the configuration can include an indication of the MCS table representing the MCS table with the largest QAM used among potential co-scheduled UEs (referred to as maximum MCS table), e.g., as being maximum 1024QAM, or maximum 256QAM, or maximum 64QAM, or smaller QAM, etc. Different MCS index tables can include different sets of possible modulation orders, and the UE 104 can use the correct set of modulation orders for co-scheduled UE signal detection when the MCS tables of each of the co-scheduled UE uses are signaled by the network. In another example, the information related to the MCS configuration can include a bit or other indicator of whether all of the co-scheduled UEs have an aligned MCS table (e.g., to one another and/or to the served UE 104).

In another example, information processing component 352 can receive the indication of the information including a bit indicating that in each individual physical resource block (PRB), or other resource unit, allocated to the target UE, the following condition is satisfied: only single modulation order is allocated for the one or more co-scheduled UEs that have the same demodulation reference signal (DMRS) sequence as the target UE 104, if the co-scheduled UE(s) exist. In one example, information processing component 352 can receive this information in DCI signaling from the base station 102. In another example, information processing component 352 can receive the indication of the information indicating whether symbols (e.g., OFDM symbols) for PDSCH is assumed to be the same for the target UE 104 and the one or more co-scheduled UEs.

In method 600, at Block 604, a downlink signal intended for the UE can be transmitted, where the signal is interfered by one or more interference signals transmitted to the one or more co-scheduled UEs. In an aspect, BS communicating component 442, e.g., in conjunction with processor(s) 412, memory/memories 416, transceiver 402, etc., can transmit, the downlink signal intended for the UE (e.g., the served UE), where the signal is interfered by one or more interference signals transmitted to the one or more co-scheduled UEs. As described, in MU-MIMO, the network node can concurrently transmit downlink signals to multiple UEs, including the served UE and the one or more co-scheduled UEs, such that signals transmitted to the co-scheduled UEs may interfere with the signal transmitted to the served UE. For example, the downlink signal and/or interference signals may include PDSCH signals transmitted by the network node.

In method 500, at Block 504, a downlink signal intended for the UE can be received, from the network node, where the signal is interfered by one or more interference signals transmitted to the one or more co-scheduled UEs. In an aspect, UE communicating component 342, e.g., in conjunction with processor(s) 312, memory/memories 316, transceiver 302, etc., can receive, from the network node (e.g., base station 102), the downlink signal intended for the UE 104, where the signal is interfered by one or more interference signals transmitted (e.g., by the base station 102) to the one or more co-scheduled UEs. For example, the signal can be concurrently transmitted with the one or more interference signals, which can be multiplexed with the downlink signal for the UE 104. Using the received assistance information or other indications, for example, UE 104 can cancel the interference signals to improve signal quality of the downlink signal.

In method 500, at Block 506, the one or more interference signals can be removed from the downlink signal based on the indication. In an aspect, interference cancelling component 354, e.g., in conjunction with processor(s) 312, memory/memories 316, transceiver 302, UE communicating component 342, etc., can remove, based on the indication, the one or more interference signals from the downlink signal. For example, using the assistance information or other indicators, interference cancelling component 354 can cancel the interfering signal(s) from the downlink signal. For example, interference cancelling component 354 can obtain, from the assistance information related to the MCS configuration, the MCS index table(s) for the interfering signals, and can accordingly use the correct set of modulation orders for detecting and accordingly cancelling the one or more interference signals.

In one example, interference cancelling component 354 can remove the one or more interference signals, for co-scheduled UEs having the same DMRS sequence as the target UE 104, from the downlink signal based on an indication indicated in the information that a single modulation order is allocated for co-scheduled UEs having the same DMRS sequence as the target UE 104. In another example, interference cancelling component 354 can remove the one or more interference signals from the downlink signal based on a certain MCS indicated in the information, such as the MCS table representing the MCS table with the largest QAM used among potential co-scheduled UEs (referred to as maximum MCS table), e.g., as being maximum 1024QAM, or maximum 256QAM, or maximum 64QAM, or smaller QAM, etc. In another example, interference cancelling component 354 can remove the one or more interference signals from the downlink signal in the OFDM symbols of the downlink signal based on a received indication that the OFDM symbols for the downlink signal (e.g., PDSCH symbols) are assumed to be the same for the target UE 104 and the one or more co-scheduled UEs.

In method 600, optionally at Block 608, a second indication of at least one of whether the one or more interference signals on each of the multiple layers are from a same co-scheduled UE or a number of the one or more co-scheduled UEs that are scheduled in each slot can be transmitted for the UE. In an aspect, configuring component 452, e.g., in conjunction with processor(s) 412, memory/memories 416, transceiver 402, BS communicating component 442, etc., can transmit, for the UE (e.g., UE 104), the second indication of at least one of whether the one or more interference signals on each of multiple layers are from the same co-scheduled UE (e.g., of the one or more co-scheduled UEs) or the number of the one or more co-scheduled UEs that are scheduled in each slot. For example, where the interference signals on multiple layers are for the same co-scheduled UE, this can imply that the interference signals on the multiple layers have the same modulation order, which can reduce the set of possible interference signals (e.g., signal $x_i$). In an example, the indication of the number of the one or more co-scheduled UEs that are scheduled in each slot can include the number of orthogonal co-scheduled UEs on any slot, or an indication of whether the number is larger than one, or an indication of whether the interfering layers (e.g., whether the interference signals on the multiple layers) have the same modulation order.

In method 500, optionally at Block 508, a second indication of at least one of whether the one or more interference signals on each of the multiple layers are from a same co-scheduled UE or a number of the one or more co-scheduled UEs that are scheduled in each slot can be received from the network node. In an aspect, information processing component 352, e.g., in conjunction with processor(s) 312, memory/memories 316, transceiver 302, UE communicating component 342, etc., can receive, from the network node (e.g., base station 102), the second indication of at least one of whether the one or more interference signals on each of multiple layers are from the same co-scheduled UE (e.g., of the one or more co-scheduled UEs) or the number of co-scheduled UEs that are scheduled in each slot. For example, the second indication can be transmitted and/or received using RRC signaling, MAC-CE, DCI, etc. If co-scheduled UE(s) are on multiple layers, whether signals from all interfering layers are from the same interfering UE can be indicated. When the co-scheduled UE signal has only one codeword, all interfering layers from the same co-scheduled UE can imply that these interfering layers have the same modulation order, which can reduce the set of possible interference signals.

In one example, where information processing component 352 receives the second indication that the interference signals on each of the multiple layers are from the same co-scheduled UE, interference cancelling component 354 can use the same modulation order to cancel the interfering signals on each of the multiple layers. In another example, where information processing component 352 receives the second indication of the number of orthogonal co-scheduled UEs in a slot is one (or an indication that the number is not larger than one), interference cancelling component 354 can similarly use the same modulation order to cancel the interfering signals on each of the multiple layers. In these examples, cancelling the interference can be more efficient than if multiple co-scheduled UEs are possible in the slot. In another example, where information processing component 352 receives the second indication that the interfering layers (e.g., that the interference signals on the multiple layers) have the same modulation order, interference cancelling component 354 can similarly use the same modulation order to cancel the interfering signals on each of the multiple layers.

In method 600, optionally at Block 610, a second indication of a maximum number of co-scheduled UEs in the slot for the downlink signal can be transmitted for the UE. In an aspect, configuring component 452, e.g., in conjunction with processor(s) 412, memory/memories 416, transceiver 402, BS communicating component 442, etc., can transmit, for the UE (e.g., UE 104), the second indication of the maximum number of co-scheduled UEs in the slot for the downlink signal. In an example, the indication of the number of the one or more co-scheduled UEs that are scheduled in each slot can include the maximum number of orthogonal co-scheduled UEs on any slot, or an indication of whether the maximum number is larger than one.

In method 500, optionally at Block 510, a second indication of a maximum number of co-scheduled UEs in a slot for a downlink signal can be received from the network node. In an aspect, information processing component 352, e.g., in conjunction with processor(s) 312, memory/memories 316, transceiver 302, UE communicating component 342, etc., can receive, from the network node (e.g., base station 102), the second indication of the maximum number of co-scheduled UEs in the slot for the downlink signal. For example, the second indication can be transmitted and/or received using RRC signaling, MAC-CE, DCI, etc. In an example, where information processing component 352 receives the second indication of the maximum number of co-scheduled UEs in a slot is one (or an indication that the maximum number is not larger than one), interference cancelling component 354 can similarly use the same modulation order to cancel the interfering signals. In these examples, cancelling the interference can be more efficient than if multiple co-scheduled UEs are possible in the slot.

In method 600, optionally at Block 612, a second indication of whether all PDSCH symbols in a slot of the downlink signal are interfered by a same set of co-scheduled UEs can be transmitted for the UE. In an aspect, configuring component 452, e.g., in conjunction with processor(s) 412, memory/memories 416, transceiver 402, BS communicating component 442, etc., can transmit, for the UE (e.g., UE 104), the second indication of whether all PDSCH symbols in the slot of the downlink signal are interfered by the same set of co-scheduled UEs. For example, configuring component 452 can transmit the second indication where the BS communicating component 442 transmits the downlink signals to the same set of co-scheduled UEs in the slot. For example, this can be an indication of whether serving PDSCH symbols in one slot experience consistent interference, e.g., all the corresponding (serving PDSCH) symbols are occupied by PDSCH symbols from the same set of co-scheduled UEs. In one example, the second indication can be an indication that all the PDSCH symbols are the same across all co-scheduled UE(s).

In method 500, optionally at Block 512, a second indication of whether all PDSCH symbols in a slot of the downlink signal are interfered by a same set of co-scheduled UEs can be received from the network node. In an aspect, information processing component 352, e.g., in conjunction with processor(s) 312, memory/memories 316, transceiver 302, UE communicating component 342, etc., can receive, from the network node (e.g., base station 102), the second indication of whether all PDSCH symbols in the slot of the downlink signal are interfered by the same set of co-scheduled UEs. In one example, the second indication can be an indication that all the PDSCH symbols are the same across all co-scheduled UE(s). For example, the second indication can be transmitted and/or received using RRC signaling, MAC-CE, DCI, etc. If the second indication is received, this may indicate that the interference over the symbols of the slot is substantially uniform. In this example, interference cancelling component 354 can apply the same interference cancellation over all PDSCH symbols in the slot to cancel the interfering signals. An example is shown in FIG. 7.

Figure 7:
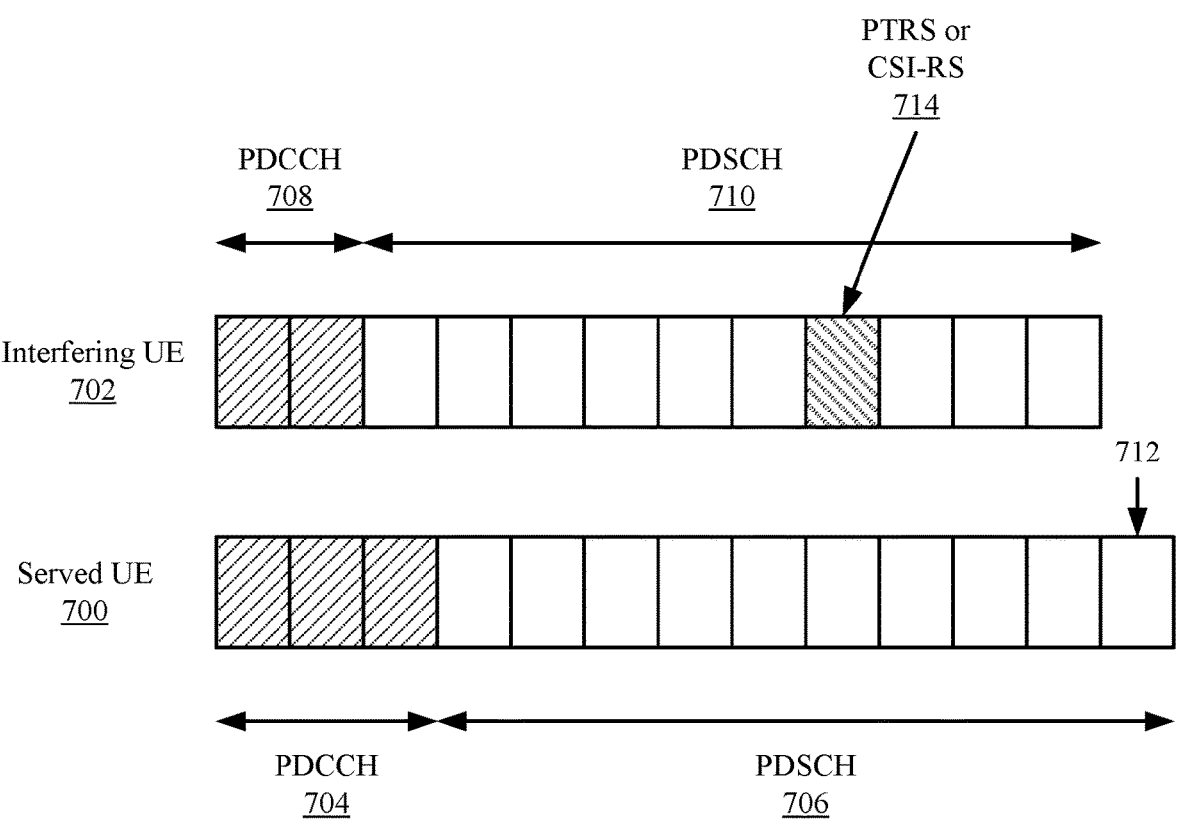
FIG. 7 illustrates examples of slot timelines for a served UE and an interfering UE, in accordance with aspects described herein.

FIG. 7 illustrates examples of slot timelines for a served UE 700 and an interfering UE 702. Served UE timeline 700 includes a first number of symbols for PDCCH 704 and a second number of symbols for PDSCH 706. Interfering UE timeline 702 can also include PDCCH symbols 708 and PDSCH symbols 710, but may be misaligned with the served UE timeline 700. In this example, the last PDSCH symbol 712 of the served UE may not experience the same interference as the other PDSCH symbols 706. In this example, configuring component 452 may not send the second indication that all PDSCH symbols in the slot of the downlink signal are interfered by the same set of co-scheduled UEs (or may send a negative indication). In this example, interference cancelling component 354 may not use the same interference cancellation to cancel interfering signals in all symbols of the slot.

In method 600, optionally at Block 614, a second indication of which PDSCH symbols in a slot of the downlink signal are interfered by a same set of co-scheduled UEs can be transmitted for the UE. In an aspect, configuring component 452, e.g., in conjunction with processor(s) 412, memory/memories 416, transceiver 402, BS communicating component 442, etc., can transmit, for the UE (e.g., UE 104), the second indication of which PDSCH symbols in the slot of the downlink signal are interfered by the same set of co-scheduled UEs. For example, the second indication may identify a range of symbols in the slot that are interfered by the same set of co-scheduled UEs, explicit symbol index identifier(s) within the slot that are interfered by the same set of co-scheduled UEs, an index of a last symbol in the slot that is interfered by the same set of co-scheduled UEs as the previously symbols, etc. In an example, referring to FIG. 7, configuring component 452 can transmit the second indication to indicate the PDSCH symbols 706 not including PDSCH symbol 712.

In method 500, optionally at Block 514, a second indication of which PDSCH symbols in a slot of the downlink signal are interfered by a same set of co-scheduled UEs can be received from the network node. In an aspect, information processing component 352, e.g., in conjunction with processor(s) 312, memory/memories 316, transceiver 302, UE communicating component 342, etc., can receive, from the network node (e.g., base station 102), the second indication of which PDSCH symbols in the slot of the downlink signal are interfered by the same set of co-scheduled UEs. For example, the second indication can be transmitted and/or received using RRC signaling, MAC-CE, DCI, etc. Referring to FIG. 7, information processing component 352 can receive the second indication to indicate the PDSCH symbols 706 not including PDSCH symbol 712. In an example, interference cancelling component 354 can cancel interference from the PDSCH symbols 706 not including PDSCH symbol 712 using the same interference cancellation, as described above.

In method 600, optionally at Block 616, a second indication of whether the one or more interference signals include one or more of a phase tracking reference signal (PTRS) or channel state information reference signal (CSI-RS) transmitted for the one or more co-scheduled UEs can be transmitted for the UE. In an aspect, configuring component 452, e.g., in conjunction with processor(s) 412, memory/memories 416, transceiver 402, BS communicating component 442, etc., can transmit, for the UE (e.g., UE 104), the second indication of whether the one or more interference signals include one or more of a PTRS or CSI-RS transmitted for the one or more co-scheduled UEs. For example, the second indication may identify whether the interfering signals include the PTRS or CSI-RS or a symbol index within the slot that includes the PTRS or CSI-RS (e.g., from any of the one or more co-scheduled UEs). The symbols that do not include PTRS or CSI-RS may have substantially uniform interference, which can be similarly cancelled, as described herein. In an example, referring to FIG. 7, configuring component 452 can transmit the second indication to indicate presence of PTRS or CSI-RS and/or indicate the symbol 714 including the PTRS or CSI-RS.

In method 500, optionally at Block 516, a second indication of whether the one or more interference signals include one or more of a PTRS or CSI-RS transmitted for the one or more co-scheduled UEs can be received from the network node. In an aspect, information processing component 352, e.g., in conjunction with processor(s) 312, memory/memories 316, transceiver 302, UE communicating component 342, etc., can receive, from the network node (e.g., base station 102), the second indication of whether the one or more interference signals include one or more of a PTRS or CSI-RS transmitted for the one or more co-scheduled UEs. For example, the second indication can be transmitted and/or received using RRC signaling, MAC-CE, DCI, etc. Referring to FIG. 7, information processing component 352 can receive the second indication to indicate presence of the PTRS or CSI-RS symbol 714, and/or the resource location (e.g., a symbol index within the slot) of the PTRS or CSI-RS symbol 714. In an example, where the resource location of the PTRS or CSI-RS symbol 714 is indicated or otherwise known, interference cancelling component 354 can cancel interference from the PDSCH symbols 706 not including PTRS or CSI-RS symbol 714 using the same interference cancellation, as described above.

In method 600, optionally at Block 618, a second indication of whether the scrambling sequences used for transmitting the interfering signals to the one or more co-scheduled UEs are the same as the scrambling sequence used for transmitting the downlink signal to the UE can be transmitted for the UE. In an aspect, configuring component 452, e.g., in conjunction with processor(s) 412, memory/memories 416, transceiver 402, BS communicating component 442, etc., can transmit, for the UE (e.g., UE 104), the second indication of whether the scrambling sequences used for transmitting the interfering signals to the one or more co-scheduled UEs are the same as the scrambling sequence used for transmitting the downlink signal to the UE. For example, the second indication may identify whether the scrambling sequences are aligned between the downlink signal transmitted to the served UE and the interfering signals transmitted to all of the one or more co-scheduled UEs. If so, this can indicate substantially uniform interference over the symbols of the slot.

In method 500, optionally at Block 518, a second indication of whether the scrambling sequences used for transmitting the interfering signals to the one or more co-scheduled UEs are the same as the scrambling sequence used for transmitting the downlink signal to the UE can be received from the network node. In an aspect, information processing component 352, e.g., in conjunction with processor(s) 312, memory/memories 316, transceiver 302, UE communicating component 342, etc., can receive, from the network node (e.g., base station 102), the second indication of whether the scrambling sequences used for transmitting the interfering signals to the one or more co-scheduled UEs are the same as the scrambling sequence used for transmitting the downlink signal to the UE. For example, the second indication can be transmitted and/or received using RRC signaling, etc. In an example, where the scrambling sequences are the same, this can indicate substantially uniform interference over the symbols of the slot. In this example, interference cancelling component 354 can cancel interference from the PDSCH symbols 706 using the same interference cancellation (e.g., assuming the interference is otherwise substantially uniform based on receiving the other indications described above or not receiving negative values for the other indications described above).

As described in various examples herein, additional network-to-UE assistance information signaled to UE can include relatively static information that could be signaled as part of configuration, e.g., RRC signaling. For example, this information may include an indication of which MCS index table(s) for PDSCH are used for each of the co-scheduled UEs, or whether all the co-scheduled UEs have the same MCS index table with the serving UE. In another example, this information may include whether scrambling sequence is aligned between serving UE and all co-scheduled UEs. The information may also include, in some examples, dynamic or semi-static information that could be signaled with reasonable overhead, e.g., configured by RRC, updated by MAC-CE command, or indicated in DCI. This information may include a maximum number of orthogonal co-scheduled UEs on any slot, or whether all interference layers are from the same co-scheduled UE. In another example, this information may include whether serving PDSCH symbols in one slot experience consistent interference (e.g., whether all the corresponding (serving PDSCH) symbols are occupied by PDSCH symbols from the same set of co-scheduled UEs). In yet another example, this information may include whether there are any PTRS or CSI-RS on serving PDSCH symbols from any of the co-scheduled UEs. In these examples, throughput enhancement may be achieved with the above information made available to UE, as described. The network assistance signaling may be optional or mandatory as defined in 5G NR or other wireless communication technologies. An amount of achievable throughput improvement may depend on the availability of the assistance information and UE capabilities.

Figure 8:
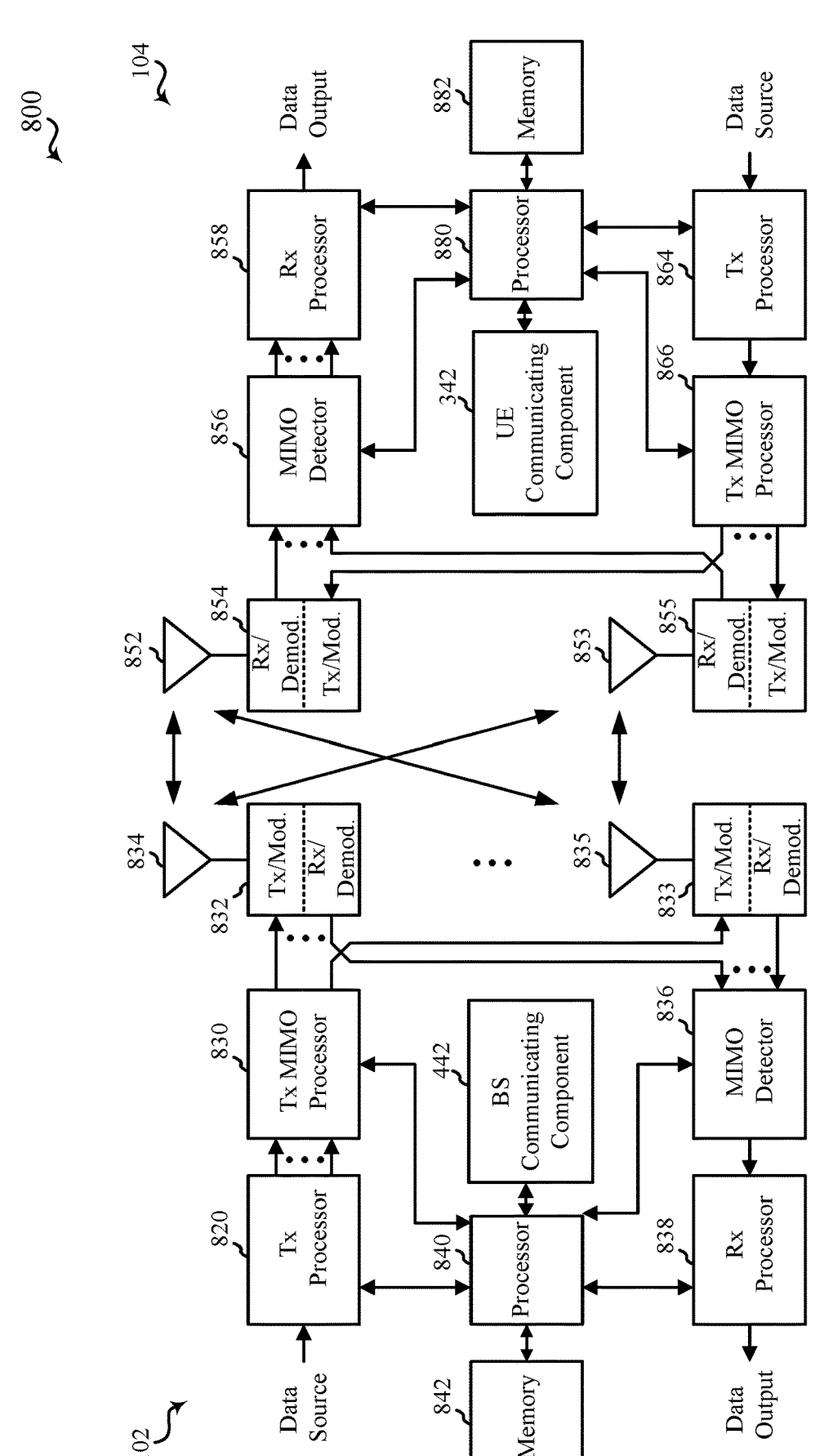
FIG. 8 is a block diagram illustrating an example of a multiple-input multiple-output (MIMO) communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1 and 3. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a UE communicating component 342 (see e.g., FIGS. 1 and 3).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for single carrier-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation. Aspect 1 is a method for wireless communication at a UE that includes receiving, from a network node, an indication of information related to a configuration, including at least one of a MCS, a PDSCH duration, a scrambling sequence, or a reference signal location, used for transmitting downlink signals to one or more co-scheduled UEs, receiving, from the network node, a downlink signal intended for the UE, where the signal is interfered by one or more interference signals transmitted to the one or more co-scheduled UEs, and removing, based on the indication, the one or more interference signals from the downlink signal.

In Aspect 2, the method of Aspect 1 includes where the information related to the MCS includes an MCS index table used for transmitting the downlink signals to each of the one or more co-scheduled UEs.

In Aspect 3, the method of Aspect 2 includes where receiving the information including the MCS index table is in RRC signaling.

In Aspect 4, the method of any of Aspects 1 to 3 includes where the information related to MCS includes an indication of whether MCS index tables used for transmitting the downlink signals to the one or more co-scheduled UEs are the same as the configured MCS index table for transmitting downlink signals to the UE.

In Aspect 5, the method of Aspect 4 includes where receiving the indication of whether the MCS index tables are the same is in RRC signaling.

In Aspect 6, the method of any of Aspects 1 to 5 includes receiving, from the network node, a second indication of at least one of whether the one or more interference signals on each of multiple interfering layers are from a same co-scheduled UE, or a number of the one or more co-scheduled UEs that are scheduled in each slot.

In Aspect 7, the method of Aspect 6 includes where receiving the second indication is in RRC signaling, MAC-CE, or DCI.

In Aspect 8, the method of any of Aspects 1 to 7 includes receiving, from the network node, a second indication of a maximum number of co-scheduled UEs in a slot for the downlink signal.

In Aspect 9, the method of Aspect 8 includes where receiving the second indication is in RRC signaling, MAC-CE, or DCI.

In Aspect 10, the method of any of Aspects 1 to 9 includes receiving, from the network node, a second indication of whether all PDSCH symbols in a slot of the downlink signal are interfered by a same set of co-scheduled UEs.

In Aspect 11, the method of Aspect 10 includes where receiving the second indication is in RRC signaling, MAC-CE, or DCI.

In Aspect 12, the method of any of Aspects 1 to 11 includes receiving, from the network node, a second indication of which PDSCH symbols in a slot of the downlink signal are interfered by a same set of co-scheduled UEs.

In Aspect 13, the method of Aspect 12 includes where receiving the second indication is in RRC signaling, MAC-CE, or DCI.

In Aspect 14, the method of any of Aspects 1 to 13 includes receiving, from the network node, a second indication of whether the one or more interference signals include one or more of PTRS or CSI-RS resources transmitted for the one or more co-scheduled UEs.

In Aspect 15, the method of Aspect 14 includes where receiving the second indication is in RRC signaling, MAC-CE, or DCI.

In Aspect 16, the method of any of Aspects 1 to 15 includes receiving, from the network node, a second indication of whether the scrambling sequences used for transmitting the interfering signals to the one or more co-scheduled UEs are the same as the scrambling sequence for transmitting the downlink signal to the UE.

In Aspect 17, the method of Aspect 16 includes where receiving the second indication is in RRC signaling.

Aspect 18 is a method for wireless communication at a network node including transmitting, for a UE, an indication of information related to a configuration, including at least one of a MCS, a PDSCH duration, a scrambling sequence, or a reference signal location, used for transmitting downlink signals to one or more co-scheduled UEs, and transmitting a downlink signal intended for the UE, where the signal is interfered by one or more interference signals transmitted to the one or more co-scheduled UE.

In Aspect 19, the method of Aspect 18 includes where the information related to the MCS includes an MCS index table used for transmitting the downlink signals to each of the one or more co-scheduled UEs.

In Aspect 20, the method of Aspect 19 includes where transmitting the information including the MCS index table is in RRC signaling.

In Aspect 21, the method of any of Aspects 18 to 20 includes where the information related to MCS includes an indication of whether MCS index tables used for transmitting the downlink signals to the one or more co-scheduled UEs are the same as the configured MCS index table for transmitting downlink signals to the UE.

In Aspect 22, the method of Aspect 21 includes where transmitting the indication of whether the MCS index tables are the same is in RRC signaling.

In Aspect 23, the method of any of Aspects 18 to 22 includes transmitting, for the UE, a second indication of at least one of whether the one or more interference signals on each of multiple interfering layers are from a same co-scheduled UE, or a number of the one or more co-scheduled UEs that are scheduled in each slot.

In Aspect 24, the method of Aspect 23 includes where transmitting the second indication is in RRC signaling, MAC-CE, or DCI.

In Aspect 25, the method of any of Aspects 18 to 24 includes transmitting, for the UE, a second indication of a maximum number of co-scheduled UEs in a slot for the downlink signal.

In Aspect 26, the method of Aspect 25 includes where transmitting the second indication is in RRC signaling, MAC-CE, or DCI.

In Aspect 27, the method of any of Aspects 18 to 26 includes transmitting, for the UE, a second indication of whether all PDSCH symbols in a slot of the downlink signal are interfered by a same set of co-scheduled UEs.

In Aspect 28, the method of Aspect 27 includes where transmitting the second indication is in RRC signaling, MAC-CE, or DCI.

In Aspect 29, the method of any of Aspects 18 to 28 includes transmitting, for the UE, a second indication of which PDSCH symbols in a slot of the downlink signal are interfered by a same set of co-scheduled UEs.

In Aspect 30, the method of Aspect 29 includes where transmitting the second indication is in RRC signaling, MAC-CE, or DCI.

In Aspect 31, the method of any of Aspects 18 to 30 includes transmitting, for the UE, a second indication of whether the one or more interference signals includes one or more of PTRS or CSI-RS resources transmitted for the one or more co-scheduled UEs.

In Aspect 32, the method of Aspect 31 includes where transmitting the second indication is in RRC signaling, MAC-CE, or DCI.

In Aspect 33, the method of any of Aspects 18 to 32 includes transmitting, for the UE, a second indication of whether the scrambling sequences used for transmitting the interfering signals to the one or more co-scheduled UEs are the same as the scrambling sequence for transmitting the downlink signal to the UE.

In Aspect 34, the method of Aspect 33 includes where transmitting the second indication is in RRC signaling.

In Aspect 35, the method of Aspect 1 includes where the information related to the MCS indicates an MCS index table used for transmitting the downlink signals to each of the one or more co-scheduled UEs.

In Aspect 36, the method of Aspect 35 includes where receiving the information indicating the MCS index table is in RRC signaling.

In Aspect 37, the method of Aspect 1 includes where the information related to MCS includes an indication of a maximum MCS table used for transmitting the downlink signals to the one or more co-scheduled UEs.

In Aspect 38, the method of Aspect 37 includes where the indication of the maximum MCS table indicates whether the maximum MCS table is of a certain QAM or not, where certain QAM is one of 1024QAM, 256QAM, or 64QAM.

In Aspect 39, the method of any of Aspects 37 or 38 includes where receiving the indication of the maximum MCS index table is in RRC signaling.

In Aspect 40, the method of Aspect 1 includes receiving, from the network node, a second indication of whether the one or more interference signals on each of multiple interfering layers have a same modulation order.

In Aspect 41, the method of Aspect 40 includes where receiving the second indication is in RRC signaling, MAC-CE, or DCI.

In Aspect 42, the method of Aspect 1 includes receiving, from the network node, a second indication of whether all PDSCH symbols in a slot of the downlink signal are the same across a set of co-scheduled UEs.

In Aspect 43, the method of Aspect 42 includes where receiving the second indication is in RRC signaling, MAC-CE, or DCI.

In Aspect 44, the method of Aspect 1 includes where the information related to the MCS indicates whether a single modulation order is allocated for the one or more co-scheduled UEs that have a same demodulation reference signal (DMRS) sequence as the UE.

In Aspect 45, the method of Aspect 44 includes where receiving the information is in DCI signaling.

In Aspect 46, the method of Aspect 18 includes where the information related to the MCS indicates an MCS index table used for transmitting the downlink signals to each of the one or more co-scheduled UEs.

In Aspect 47, the method of Aspect 46 includes where transmitting the information indicating the MCS index table is in RRC signaling.

In Aspect 48, the method of Aspect 18 includes where the information related to MCS includes an indication of a maximum MCS table used for transmitting the downlink signals to the one or more co-scheduled UEs.

In Aspect 49, the method of Aspect 48 includes where the indication of the maximum MCS table indicates whether the maximum MCS table is of a certain QAM or not, where the certain QAM is one of 1024QAM, 256QAM, or 64QAM.

In Aspect 50, the method of any of Aspects 48 or 49 includes where transmitting the indication of the maximum MCS index table is in RRC signaling.

In Aspect 51, the method of Aspect 18 includes transmitting, for the UE, a second indication of whether the one or more interference signals on each of multiple interfering layers have a same modulation order.

In Aspect 52, the method of Aspect 51 includes where transmitting the second indication is in RRC signaling, MAC-CE, or DCI.

In Aspect 53, the method of Aspect 18 includes transmitting, for the UE, a second indication of whether all PDSCH symbols in a slot of the downlink signal are the same across a set of co-scheduled UEs.

In Aspect 54, the method of Aspect 53 includes where transmitting the second indication is in RRC signaling, MAC-CE, or DCI.

In Aspect 55, the method of Aspect 18 includes where the information related to the MCS indicates whether a single modulation order is allocated for the one or more co-scheduled UEs that have a same DMRS sequence as the UE.

In Aspect 56, the method of Aspect 55 includes where transmitting the information is in DCI signaling.

Aspect 57 is an apparatus for wireless communication including a processor, memory coupled with the processor, and instructions stored in the memory and operable, when executed by the processor, to cause the apparatus to perform any of the methods of Aspects 1 to 56.

Aspect 58 is an apparatus for wireless communication including means for performing any of the methods of Aspects 1 to 56.

Aspect 59 is a computer-readable medium including code executable by one or more processors for wireless communications, the code including code for performing any of the methods of Aspects 1 to 56.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
one or more memories configured to, individually or in combination, store instructions; and
one or more processors communicatively coupled with the one or more memories, wherein the one or more processors are, individually or in combination, configured to execute the instructions to cause the apparatus to:
receive, from a network node, an indication of information used by the network node for transmitting downlink signals to one or more co-scheduled UEs scheduled with resources that are spatially multiplexed with resources scheduled for the apparatus, including at least one of a modulation and coding scheme (MCS) used for transmitting the downlink signals to the one or more co-scheduled UEs, a physical downlink shared channel (PDSCH) duration used for transmitting the downlink signals to the one or more co-scheduled UEs, a scrambling sequence used for transmitting the downlink signals to the one or more co-scheduled UEs, or a reference signal location used for transmitting the downlink signals to the one or more co-scheduled UEs;
receive, from the network node, a downlink signal intended for the apparatus, wherein the downlink signal is interfered by one or more interference signals transmitted to the one or more co-scheduled UEs; and remove, based on the indication, the one or more interference signals from the downlink signal.

2. The apparatus of claim 1, wherein the information related to the MCS indicates an MCS index table used for transmitting the downlink signals to each of the one or more co-scheduled UEs.

3. The apparatus of claim 2, the one or more processors are, individually or in combination, configured to execute the instructions to cause the apparatus to receive the information indicating the MCS index table in radio resource control (RRC) signaling.

4. The apparatus of claim 1, wherein the information related to MCS includes an indication of whether MCS index tables used for transmitting the downlink signals to the one or more co-scheduled UEs are the same as a configured MCS index table for transmitting downlink signals to the apparatus.

5. The apparatus of claim 4, the one or more processors are, individually or in combination, configured to execute the instructions to cause the apparatus to receive the indication of whether the MCS index tables are the same in radio resource control (RRC) signaling.

6. The apparatus of claim 1, wherein the information related to MCS includes an indication of a maximum MCS table used for transmitting the downlink signals to the one or more co-scheduled UEs.

7. The apparatus of claim 6, wherein the indication of the maximum MCS table indicates whether the maximum MCS table is of a certain quadrature amplitude modulation (QAM) or not, wherein the certain QAM is one of 1024QAM, 256QAM, or 64QAM.

8. The apparatus of claim 6, the one or more processors are, individually or in combination, configured to execute the instructions to cause the apparatus to receive the indication of the maximum MCS table in radio resource control (RRC) signaling.

9. The apparatus of claim 1, the one or more processors are, individually or in combination, configured to execute the instructions to cause the apparatus to receive, from the network node, a second indication of whether the one or more interference signals on each of multiple interfering layers have a same modulation order on each PRB allocated to the apparatus.

10. The apparatus of claim 9, the one or more processors are, individually or in combination, configured to execute the instructions to cause the apparatus to receive the second indication in radio resource control (RRC) signaling, media access control (MAC) control element (CE), or downlink control information (DCI).

11. The apparatus of claim 1, the one or more processors are, individually or in combination, configured to execute the instructions to cause the apparatus to receive, from the network node, a second indication of whether all physical downlink shared channel (PDSCH) symbols in a slot of the downlink signal are the same across a set of co-scheduled UEs.

12. The apparatus of claim 10, the one or more processors are, individually or in combination, configured to execute the instructions to cause the apparatus to receive the second indication in radio resource control (RRC) signaling, media access control (MAC) control element (CE), or downlink control information (DCI).

13. The apparatus of claim 12, the one or more processors are, individually or in combination, configured to execute the instructions to cause the apparatus to receive the information in downlink control information (DCI) signaling.

14. An apparatus for wireless communication, comprising:

a transceiver;

one or more memories configured to, individually or in combination, store instructions; and one or more processors communicatively coupled with the one or more memories, wherein the one or more processors are, individually or in combination, configured to execute the instructions to cause the apparatus to:

transmit, for a user equipment (UE), an indication of information used by the apparatus for transmitting downlink signals to one or more co-scheduled UEs scheduled with resources that are spatially multiplexed with resources scheduled for the UE, including at least one of a modulation and coding scheme (MCS) used for transmitting the downlink signals to the one or more co-scheduled UEs, a physical downlink shared channel (PDSCH) duration used for transmitting the downlink signals to the one or more co-scheduled UEs, a scrambling sequence used for transmitting the downlink signals to the one or more co-scheduled UEs, or a reference signal location used for transmitting the downlink signals to the one or more co-scheduled UEs; and transmit a downlink signal intended for the UE, wherein the downlink signal is interfered by one or more interference signals transmitted to the one or more co-scheduled UE.

15. The apparatus of claim 14, wherein the information related to the MCS indicates an MCS index table used for transmitting the downlink signals to each of the one or more co-scheduled UEs.

16. The apparatus of claim 15, wherein the one or more processors are, individually or in combination, configured to execute the instructions to cause the apparatus to transmit the information indicating the MCS index table in radio resource control (RRC) signaling.

17. The apparatus of claim 14, wherein the information related to MCS includes an indication of whether MCS index tables used for transmitting the downlink signals to the one or more co-scheduled UEs are the same as a configured MCS index table for transmitting downlink signals to the UE.

18. The apparatus of claim 17, wherein the one or more processors are, individually or in combination, configured to execute the instructions to cause the apparatus to transmit the indication of whether the MCS index tables are the same in radio resource control (RRC) signaling.

19. The apparatus of claim 14, wherein the information related to MCS includes an indication of a maximum MCS table used for transmitting the downlink signals to the one or more co-scheduled UEs.

20. The apparatus of claim 19, wherein the indication of the maximum MCS table indicates whether the maximum MCS table is of a certain quadrature amplitude modulation (QAM) or not, wherein the certain QAM is one of 1024QAM, 256QAM, or 64QAM.

21. The apparatus of claim 19, wherein the one or more processors are, individually or in combination, configured to execute the instructions to cause the apparatus to transmit the indication of the maximum MCS table in radio resource control (RRC) signaling.

22. The apparatus of claim 14, wherein the one or more processors are, individually or in combination, configured to execute the instructions to cause the apparatus to transmit, for the UE, a second indication of whether the one or more interference signals on each of multiple interfering layers have a same modulation order.

23. The apparatus of claim 22, wherein the one or more processors are, individually or in combination, configured to execute the instructions to cause the apparatus to transmit the second indication in radio resource control (RRC) signaling, media access control (MAC) control element (CE), or downlink control information (DCI).

24. The apparatus of claim 14, wherein the one or more processors are, individually or in combination, configured to execute the instructions to cause the apparatus to transmit, for the UE, a second indication of whether all physical downlink shared channel (PDSCH) symbols in a slot of the downlink signal are the same across a set of co-scheduled UEs.

25. The apparatus of claim 24, wherein the one or more processors are, individually or in combination, configured to execute the instructions to cause the apparatus to transmit the second indication in radio resource control (RRC) signaling, media access control (MAC) control element (CE), or downlink control information (DCI).

26. The apparatus of claim 14, wherein the information related to the MCS indicates whether a single modulation order is allocated for the one or more co-scheduled UEs that have a same demodulation reference signal (DMRS) sequence as the UE.

27. A method for wireless communication at a user equipment (UE), comprising:

receiving, from a network node, an indication of information used by the network node for transmitting downlink signals to one or more co-scheduled UEs scheduled with resources that are spatially multiplexed with resources scheduled for the UE, including at least one of a modulation and coding scheme (MCS) used for transmitting the downlink signals to the one or more co-scheduled UEs, a physical downlink shared channel (PDSCH) duration used for transmitting the downlink signals to the one or more co-scheduled UEs, a scrambling sequence used for transmitting the downlink signals to the one or more co-scheduled UEs, or a reference signal location used for transmitting the downlink signals to the one or more co-scheduled UEs;

receiving, from the network node, a downlink signal intended for the UE, wherein the downlink signal is interfered by one or more interference signals transmitted to the one or more co-scheduled UE; and removing, based on the indication, the one or more interference signals from the downlink signal.

28. The method of claim 27, wherein the information related to the MCS indicates an MCS index table used for transmitting the downlink signals to each of the one or more co-scheduled UEs.

29. A method for wireless communication at a network node, comprising:

transmitting, for a user equipment (UE), an indication of information used by the network node for transmitting downlink signals to one or more co-scheduled UEs scheduled with resources that are spatially multiplexed with resources scheduled for the UE, including at least one of a modulation and coding scheme (MCS) used for transmitting the downlink signals to the one or more co-scheduled UEs, a physical downlink shared channel PDSCH) duration used for transmitting the downlink signals to the one or more co-scheduled UEs, a scrambling sequence used for transmitting the downlink signals to the one or more co-scheduled UEs, or a reference signal location used for transmitting the downlink signals to the one or more co-scheduled UEs; and transmitting a downlink signal intended for the UE, wherein the downlink signal is interfered by one or more interference signals transmitted to the one or more co-scheduled UE.

30. The method of claim 29, wherein the information related to the MCS indicates an MCS index table used for transmitting the downlink signals to each of the one or more co-scheduled UEs.

* * * * *